United States Patent
Murdoch et al.

[11] Patent Number: 5,823,715
[45] Date of Patent: Oct. 20, 1998

[54] RAPIDLY DEPLOYED PIER

[75] Inventors: Michele Ann Murdoch, Ojai; Glenwood Bretz, Oxnard; Billie Rue Karrh, Santa Paula; Duane Albrecht Davis, Oxnard; Samuel J. Oppedisano, Ojai; William G. Hatch, Oxnard; Tsongshih Huang, Westlake Village; Kit L. Mack; Sheng S. Lin, both of Camarillo, all of Calif.

[73] Assignee: The United States of America as represented by the Secretary of the Navy, Washington, D.C.

[21] Appl. No.: 937,700

[22] Filed: Sep. 29, 1997

[51] Int. Cl.$^6$ .............................. B63C 1/00; B63B 35/44
[52] U.S. Cl. .......................... 405/219; 405/218; 114/258; 114/263
[58] Field of Search .................................. 114/258, 263; 405/218, 219, 220

[56] References Cited

U.S. PATENT DOCUMENTS

| | | |
|---|---|---|
| 3,347,051 | 10/1967 | Bjerke et al. . |
| 3,747,354 | 7/1973 | Macomber ................................. 61/48 |
| 4,085,781 | 4/1978 | Serpas et al. ................................. 141/1 |
| 4,197,034 | 4/1980 | Odegaard ................................. 405/219 |
| 4,642,000 | 2/1987 | Lin ................................. 405/221 |
| 4,838,735 | 6/1989 | Warner ................................. 405/220 |
| 5,000,620 | 3/1991 | Bonnema ................................. 405/221 |
| 5,154,561 | 10/1992 | Lee ................................. 414/138.3 |
| 5,165,823 | 11/1992 | Cupples ................................. 405/219 |
| 5,623,889 | 4/1997 | Whitener ................................. 114/230 |
| 5,649,787 | 7/1997 | Hirose ................................. 405/219 |

*Primary Examiner*—Thomas B. Will
*Assistant Examiner*—Gary Scott Hartmann
*Attorney, Agent, or Firm*—David S. Kalmbaugh

[57] ABSTRACT

A pier comprising a floating pierhead structure which has transverse thrusters to assist maneuvering operations and four pedestal cranes to move cargo from and to ocean going ships docked at the structure. At the stern of the structure is a stern ramp receiving platform which is used during cargo off loading operations to allow access to the structure from ships equipped with stern ramps. The mooring system for the floating pierhead structure consist of a single point mooring anchor system located at the bow of the structure and four anchor legs located at the stern of the structure. This mooring system ensures minimal movement of the floating pierhead structure at its bow where the floating pierhead structure interfaces with a fixed position approachway, but allows the structure to be rotated over an arc of ninety degrees. The approachway for the rapidly deployed pier is a fixed position roadway connecting the floating pierhead structure to the shore line. The approachway is fabricated from individual spans supported by steel piles which are driven into the ocean floor. A bridge span which connects the approachway to the bow of the floating pierhead structure is capable of motion in six degrees of freedom relative to the approachway.

18 Claims, 12 Drawing Sheets

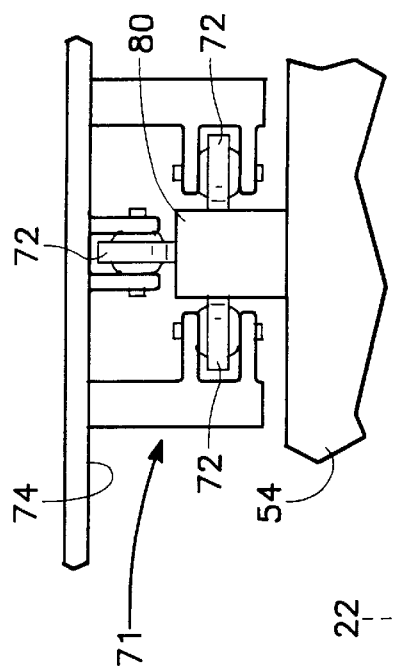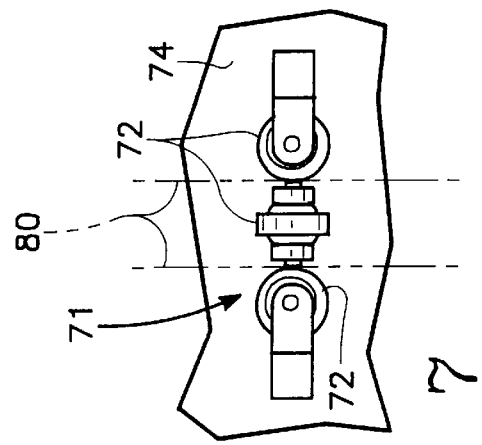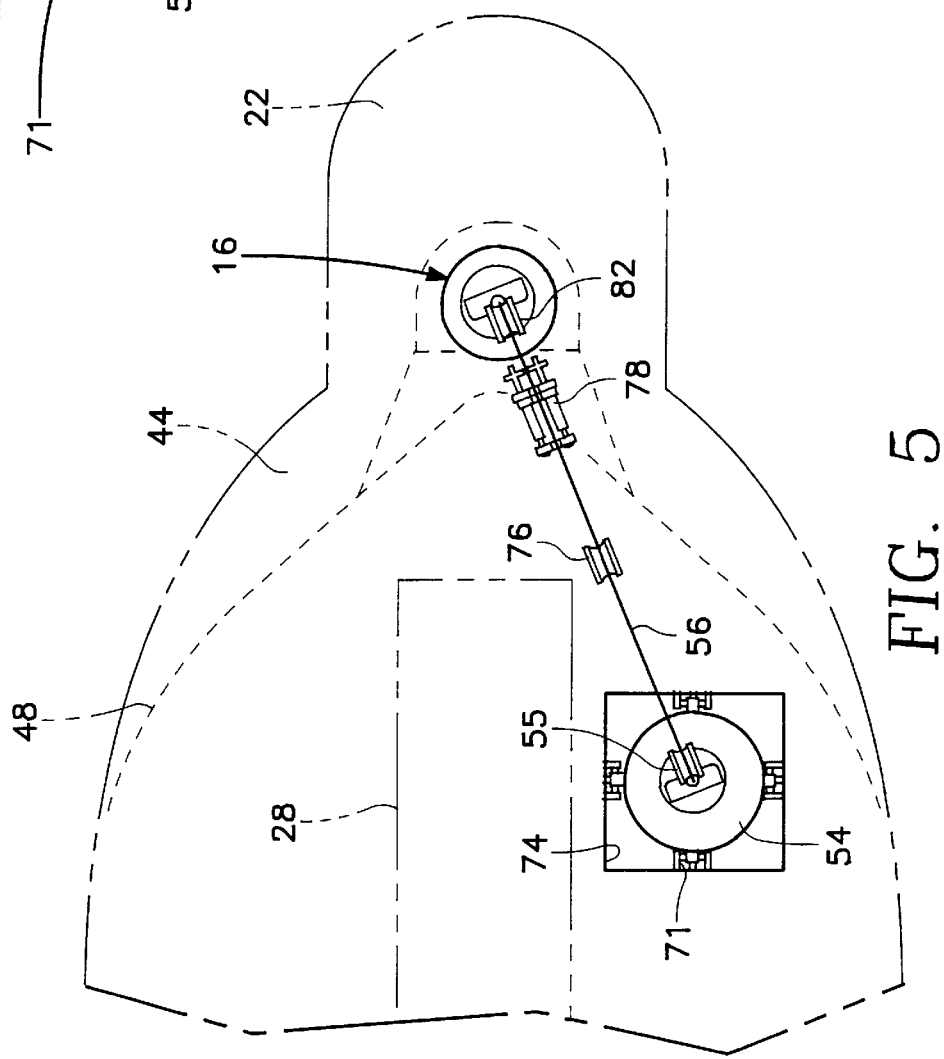

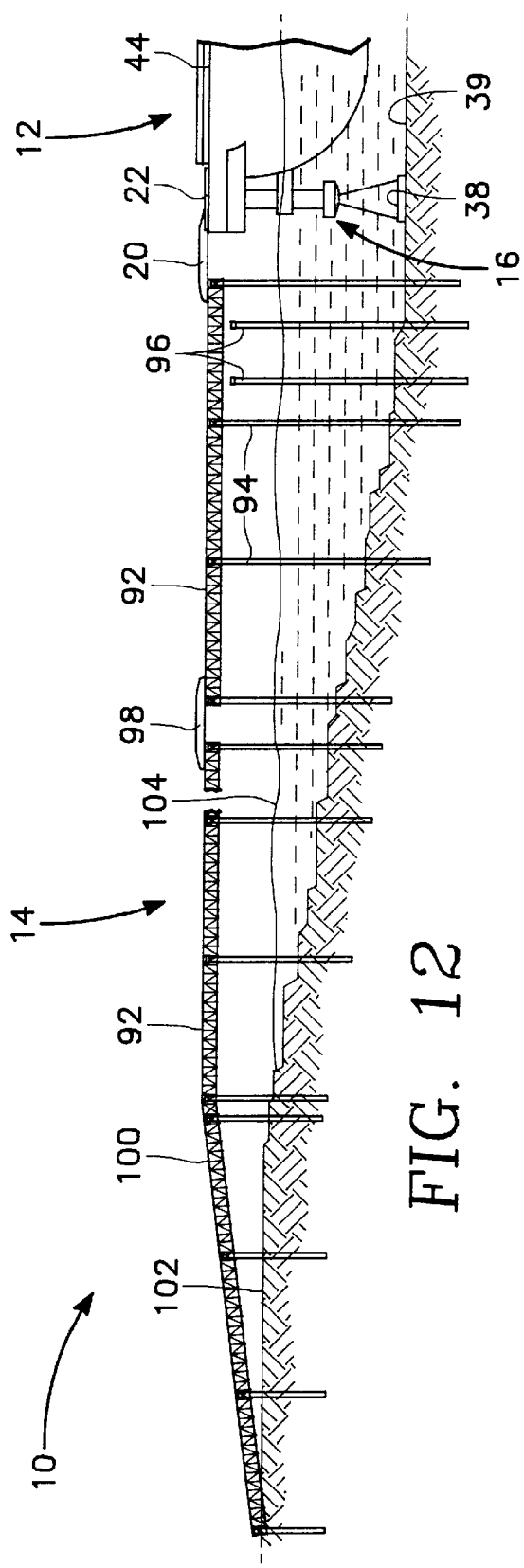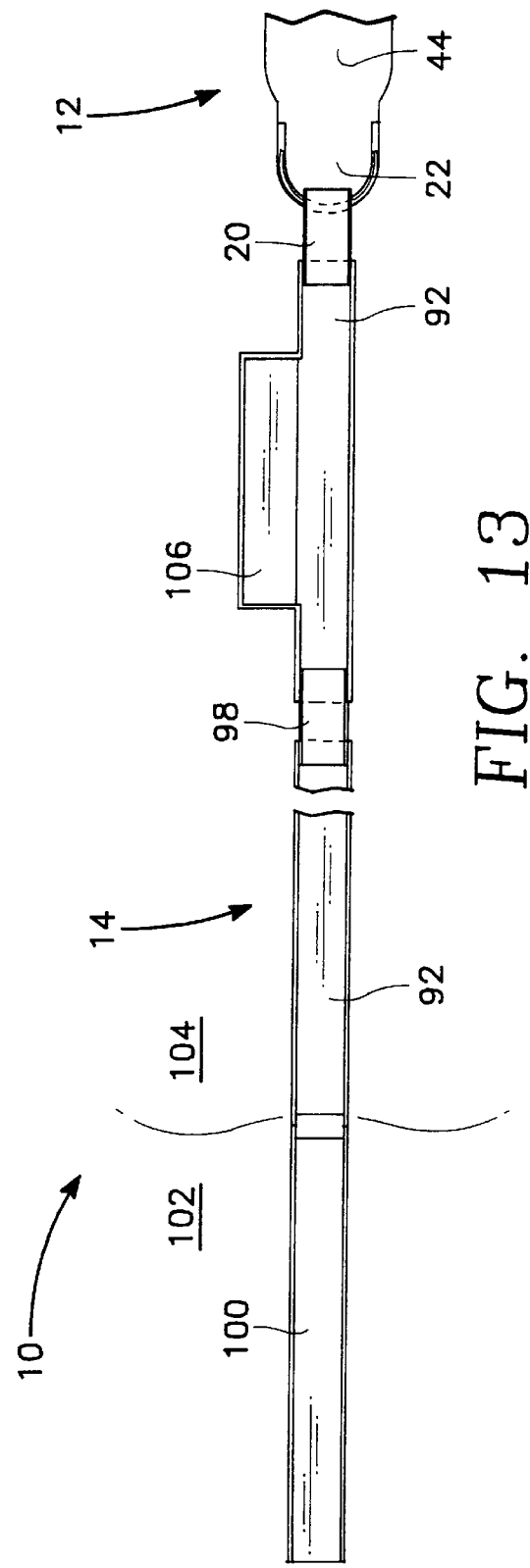

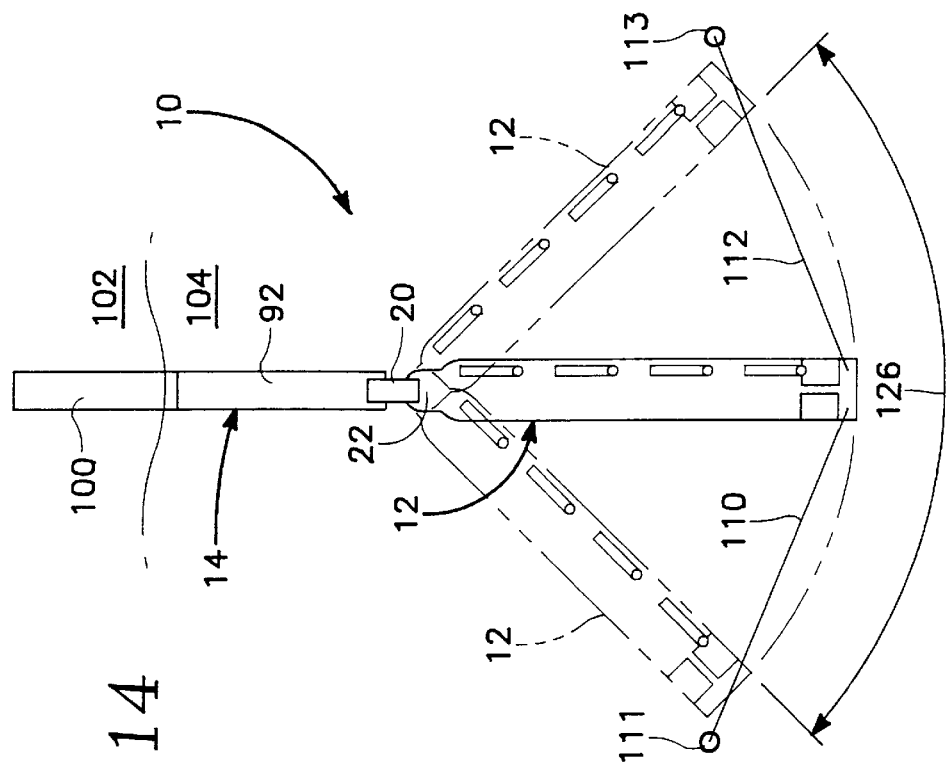
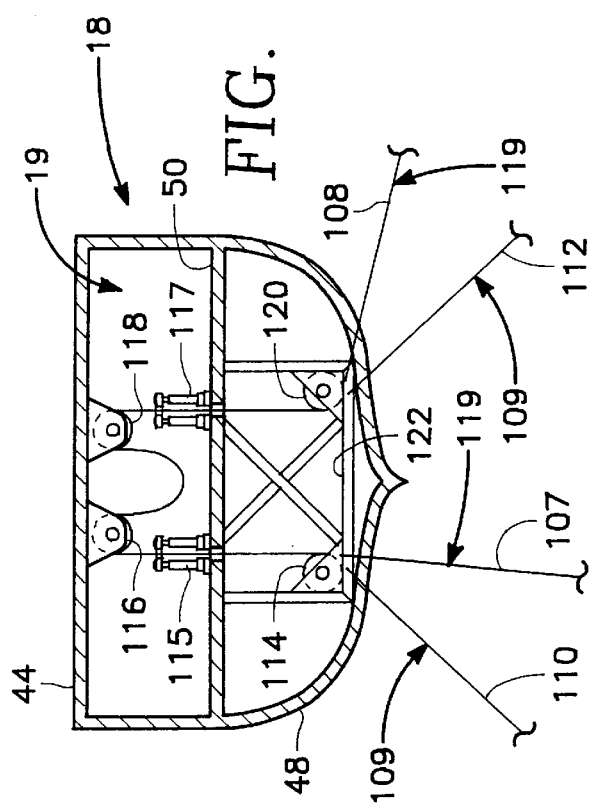
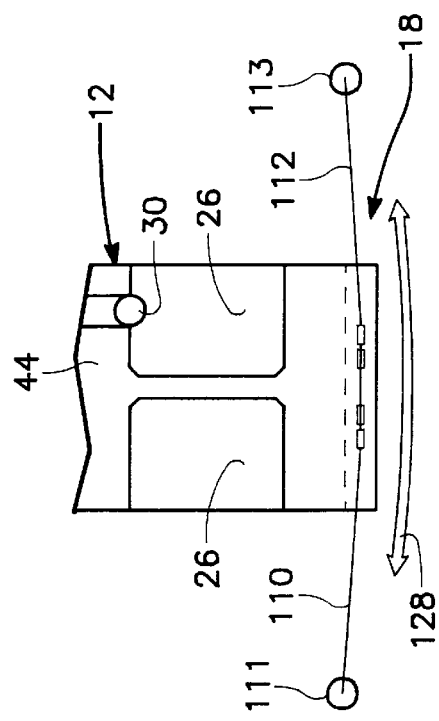

RAPIDLY DEPLOYED PIER

BACKGROUND OF THE INVENTION

1. Field of the Invention

The present invention relates generally to a floating pier which is rapidly deployed. More particularly, the present invention relates to a stable pier structure comprising a floating platform connected to a fixed point shoreline by a fixed position elevated roadway.

2. Description of the Prior Art

There is a need to provide for the military a temporary deep water port facility for deep draft ships where adequate port facilities do not exist. This need for a deep water port facility often occurs under circumstances where existing and available port facilities have been damaged or do not provide sufficient space to handle cargo being loaded and unloaded. In addition, there may be a need for a deep water port facility where one does not currently exist or when operationally the best point of entry is determined to be across an unimproved shoreline.

Currently, methods for providing logistics support over unimproved shore lines without deep water port facilities include in-stream offload of cargo from ships to lighters which then transport the cargo directly to the beach or to a shallow water expeditionary pier.

While this method of providing logistic support is adequate for delivery of relatively small quantities of cargo, in-stream offload of cargo is not satisfactory for large scale operations that require frequent off-loading of today's state of the art container ships, Roll-On/Roll-Off ships and other deep water ships bringing cargo to the operating area.

In the past portable ports have been developed to offload cargo from deep water ships for transportation to the shoreline. These portable ports include either floating pierhead platforms or pierheads fixed to the sea floor with a causeway or approachway system connecting the portable port to the shoreline. However, these prior art portable port systems do not allow for adjustment of the orientation of the pierhead once the pierhead is installed at the site.

Accordingly, there is a need for an offshore pierhead which will allow for the efficient and economical unloading of cargo from a deep water location to a nearby shoreline. In addition, there is a need to provide for an offshore pierhead which may be adjusted from its initial position over a predetermined angle relative to the approachway and shoreline.

SUMMARY OF THE INVENTION

The present invention overcomes some of the disadvantages of the prior art including those mentioned above in that it comprises a rapidly deployed pier which expeditiously provides a temporary deep water port facility for ocean going ships such as cargo ships in locations where adequate port facilities do not exist.

The rapidly deployed pier comprises a floating pierhead structure which has transverse thrusters to assist maneuvering operations and four pedestal cranes located on the starboard side of the structure to move cargo from and to ocean going ships docked at the structure. There is located at the stern of the floating pierhead structure a stern ramp receiving platform which is used during cargo off loading operations to allow access to the floating pierhead structure from ships equipped with stern ramps. Floating pierhead structure also has a pair of side access ports with clear deck areas to the main deck of structure.

The mooring system for the floating pierhead structure consist of a single point mooring anchor system located at the bow of the structure and four anchor legs located at the stern of the structure. This mooring system ensures minimal movement of the floating pierhead structure at its bow where the floating pierhead structure interfaces with a fixed position approachway, but allows the structure to be rotated over an arc of ninety degrees.

The approachway to the floating pierhead structure for the rapidly deployed pier is a fixed position, elevated roadway connecting the floating pierhead structure to the shore line. The approachway is fabricated from individual spans supported by steel piles which are driven into the ocean floor. The width of the approachway allows for two-way vehicular traffic including tractor-trailers carrying containerized and palletized cargo. The approachway also has a by-pass section located near the mid-span point which provides an area for disabled vehicles to pull off. A bridge span which connects the approachway to the bow of the floating pierhead structure is capable of motion in six degrees of freedom relative to the approachway.

BRIEF DESCRIPTION OF THE DRAWINGS

FIG. 5 is a top view of the single point mooring system of the floating pierhead structure of FIG. 1;

FIG. 6 is a plan view of one of the four equally spaced vertical rails with its associated self-adjusting bogey wheel assemblies for the counterweight of the single point mooring system of FIG. 5;

FIG. 7 is a side view of one of the four equally spaced vertical rails with its associated self-adjusting bogey wheel assemblies for the counterweight of the single point mooring system of FIG. 5;

FIG. 12 is a detailed side view of the approachway of the rapidly deployed pier system of FIG. 1;

FIG. 13 is a top view of the approachway of the rapidly deployed pier system of FIG. 1;

FIG. 14 is an end view in partial section of the adjustable seaward mooring system positioned at the stern of the floating pierhead structure of FIG. 1;

FIG. 15 is a top view of the stern of the floating pierhead structure 12 of FIG. 1; and FIG. 16 is a top view which illustrates the range of angular movement of the floating pierhead structure of FIG. 1 with respect to the approachway of FIG. 1.

DETAILED DESCRIPTION OF THE PREFERRED EMBODIMENT

Figure 1:
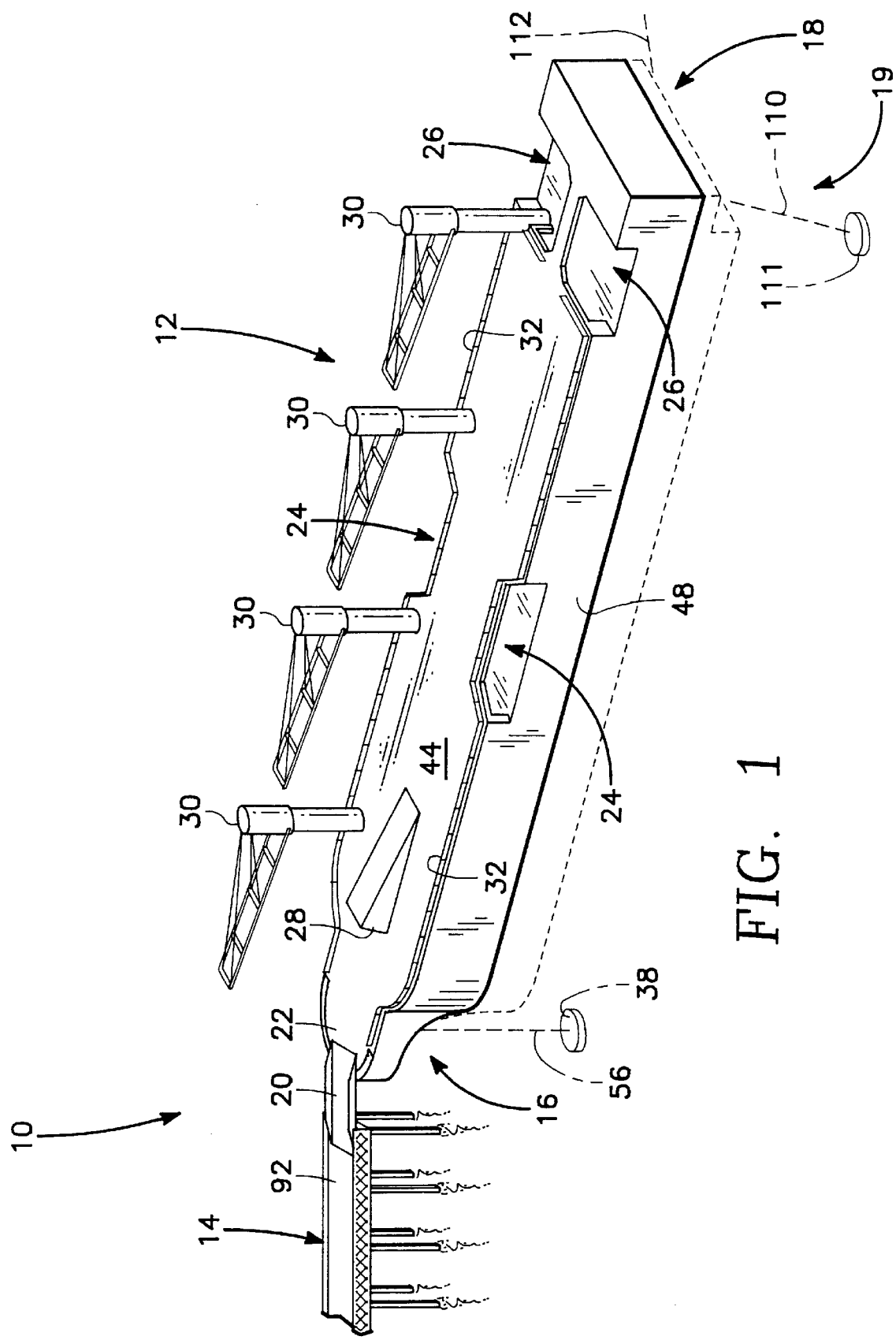
FIG. 1 is a perspective view of the rapidly deployed pier system which constitutes a preferred embodiment of the present invention.

Referring more particularly to the drawings, FIG. 1 illustrates a rapidly deployed pier system 10 in accordance with the present invention. Pier system 10 includes a floating pierhead structure 12 which may be installed in a deep water site at a minimum depth of fifty feet and connected to a nearby shoreline 102 (FIG. 12) by a fixed elevated approachway/causeway 14 of up to ten thousand feet depending upon the slope of the shoreline.

Floating pierhead structure 12 is designed for the simultaneous and direct offload of two deep cargo ships (not illustrated) of up to 1000 feet in length. For example, floating pierhead structure 12 may be used to direct offload commercial container ships, maritime prepositioned ships and fast sealift ships.

Figure 2A:
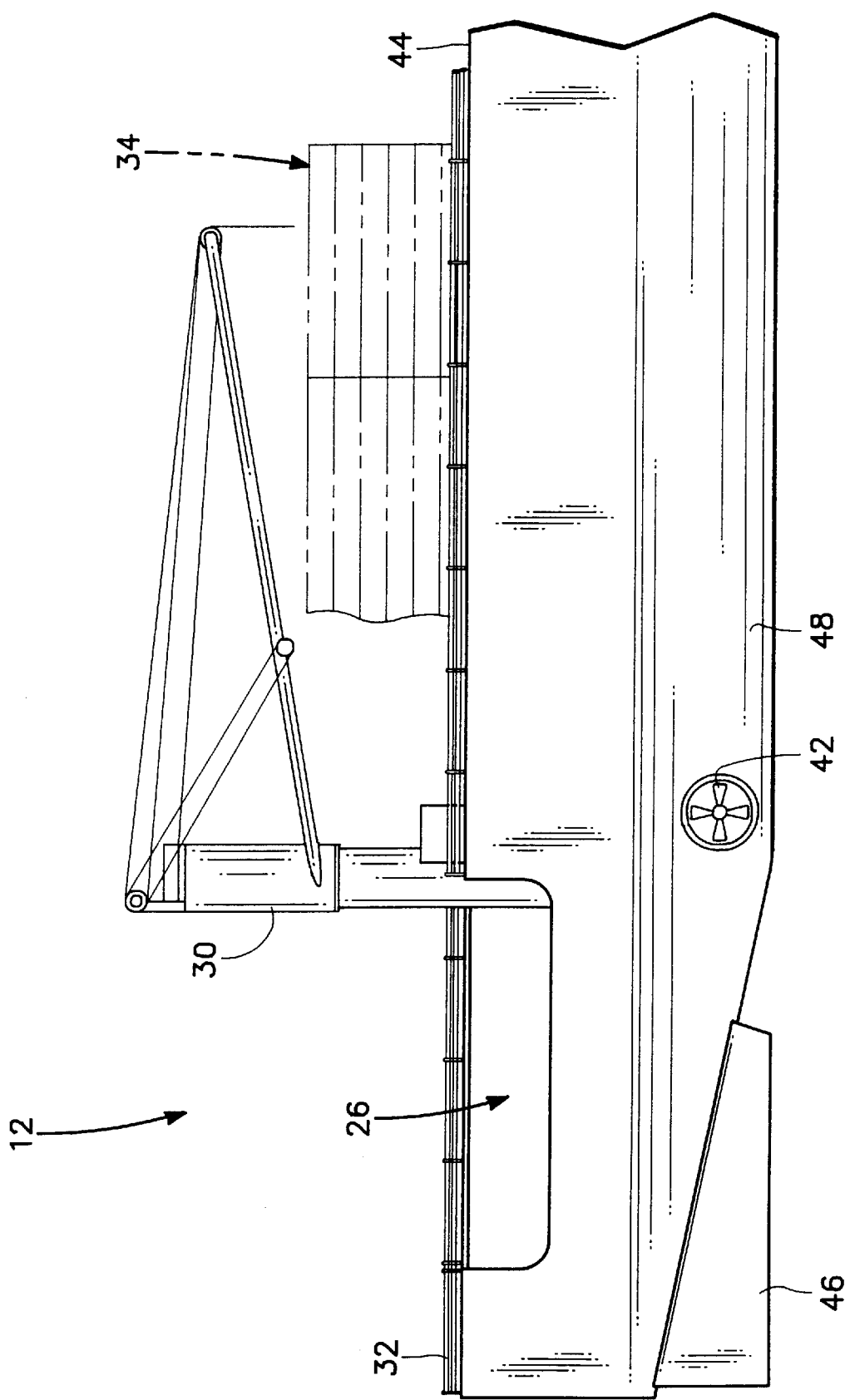
FIGS. 2A–2C illustrate a detailed side view of the floating pierhead structure of the rapidly deployed pier system of FIG. 1.

Floating pierhead structure 12 has an overall length of 950 feet, a 106 foot beam and a 71 foot depth capable of transporting causeway construction equipment and components. While floating pierhead structure 12 is not self-propelled, structure 12 includes transverse thrusters to assist in maneuvering operations of structure 12. As is best depicted in FIGS. 2A and 2C each side of floating pierhead structure 12 includes a pair of thrusters 40 and 42 with thruster 40 being positioned within hull 48 at the fore end of structure 12 and thruster 42 being positioned within hull 48 at the aft end of structure 12. Each thruster 40 and 42 comprises a tunnel-type 3000 HP transverse thruster which is sufficient for structure 12 to withstand a 0.5 knot beam current.

Floating pierhead structure 12 is capable of berthing and off-loading two cargo ships (not illustrated) simultaneously, each up to 1000 feet in length and with drafts up to 38 feet. Floating pierhead structure also has personnel support facilities and safety systems to support twenty four hour throughput operations.

Four pedestal cranes 30 which are integral to floating pierhead structure 12 are located on the starboard side of structure 12 and are mounted on the weather deck 44 of structure 12. Pedestal cranes 30 are used to lift containerized, breakbulk and lift-on/lift-off vehicular cargo from ships moored at floating pierhead structure 12. Cranes 30 are also positioned on deck 44 to allow for their use during causeway construction and pierhead mooring system installation.

There is located at the seaward end or stern 18 of floating pierhead structure 12 a stern ramp receiving platform 26 which is about one hundred twenty feet in length and one hundred six feet in width. Stern ramp receiving platform 26 is positioned approximately twelve feet above the waterline during cargo off loading operations to allow access to the pierhead structure 12 from ocean going ships equipped with stern ramps. The area of stern ramp receiving platform 26 is sufficient to permit single 51 foot radius turns from a tractor-trailer combination.

In addition, floating pierhead structure 12 has a pair of side access ports 24 with clear deck areas to the main deck 50. One side access port 24 is located on the port side of floating pierhead structure 12 while the other side access port 24 is located on the starboard side floating pierhead structure 12. Side access ports 24, which are also positioned twelve feet above the waterline, provide access to structure 12 for cargo ships that have side ramps or both stern ramps and side ramps. Each side access port has a 50 foot wide by 17 foot high clear opening and is secured by weather tight doors during transit. All roll off/roll on cargo traffic proceeds forward on the main deck 50 (FIGS. 3A–3C) up a ramp portion 28 of main deck 50 to weather deck 44 near bow 22 of floating pierhead structure 12. Cargo/vehicular traffic then proceeds across a bridge span 20 which connects causeway 14 to the bow 22 of structure 12. Bridge span 20 is capable of motion in six degrees of freedom relative to causeway 14.

Referring now to FIGS. 1, 12 and 13, as depicted in FIGS. 12 and 13, causeway 14 of rapidly deployed pier system 10 is a fixed location, elevated roadway connecting structure 12 to shoreline 102. The causeway 14 comprises a plurality of individual spans 92 and 100 which are each sixty feet long, twenty four feet wide and seven feet deep. Spans 92 and 100 provide a twenty four foot clear width for two way traffic over the length of causeway 14. There is positioned within causeway 14 near its midpoint a traffic bypass span 106 approximately one hundred eighty feet long and twenty four feet wide which provides for a pull out area for disabled vehicles or to allow extra-wide vehicles to pass.

Since causeway 14 is installed simultaneously from shoreline 102 and floating pierhead structure 12 there will be an offset where the section of causeway 14 originating at shoreline 102 is joined to the section of causeway originating at structure 12. A gap closing span 98 is provided to join the section of causeway 14 originating at shoreline 102 to the section of causeway originating at structure 12.

The causeway 14 is connected to floating pierhead structure 12 by a pierhead bridge span 20 that accommodates six degrees of motion of pierhead floating structure 12. Near shoreline 102 the spans 100 are angled approximately seven degrees to make the transition from full elevation to shoreline 102.

Spans 92 and 100 are supported by steel piles 94 which are driven into the ocean floor 39. In addition, piles 96 are used to provide support for the span 92 which is the first span installed and which is adjacent floating pierhead structure 12. There is positioned atop piles 96 a removable vertical support structure (not illustrated) which provides support for the first installed span 92 prior to installation of piles 94.

Figure 2B:
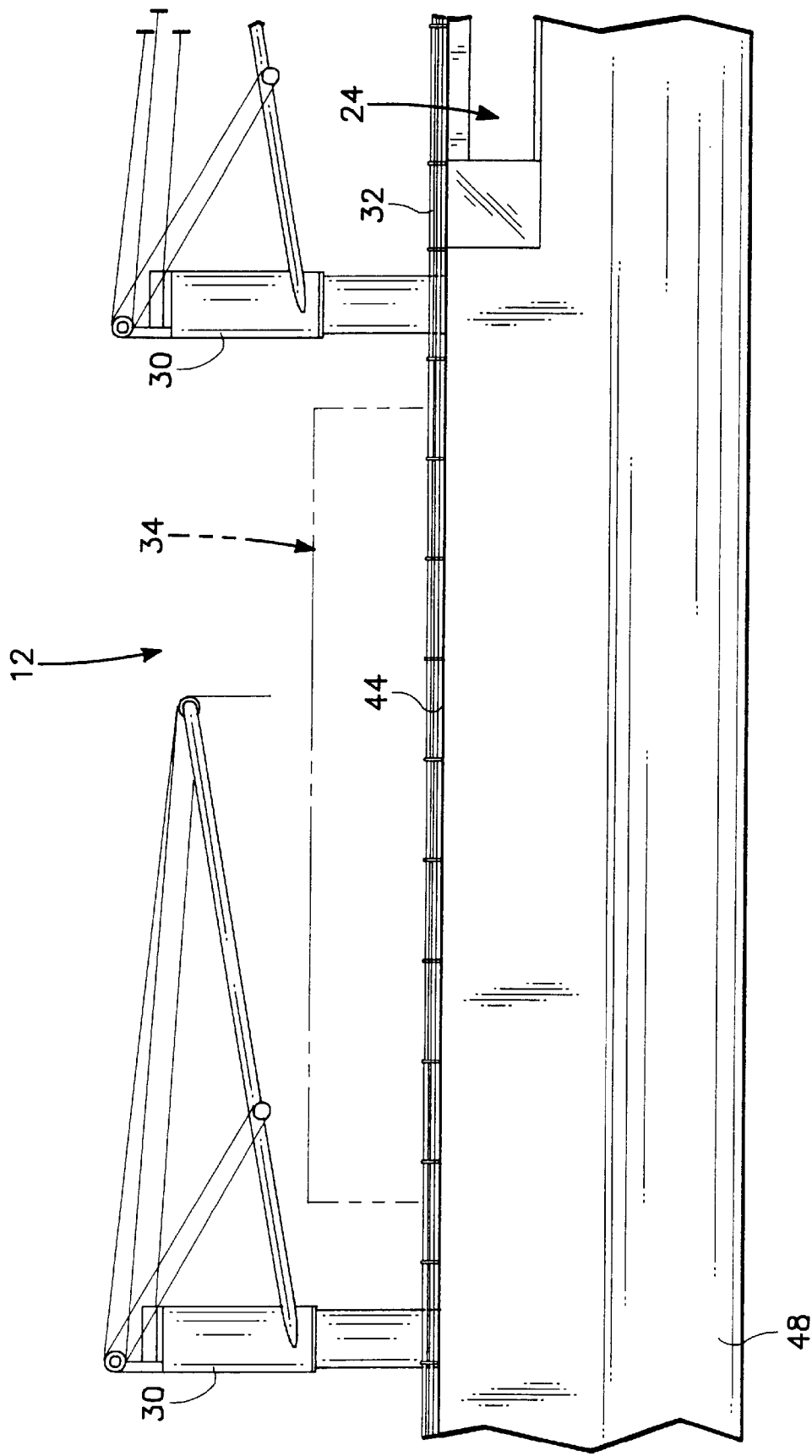
Figure 2C:
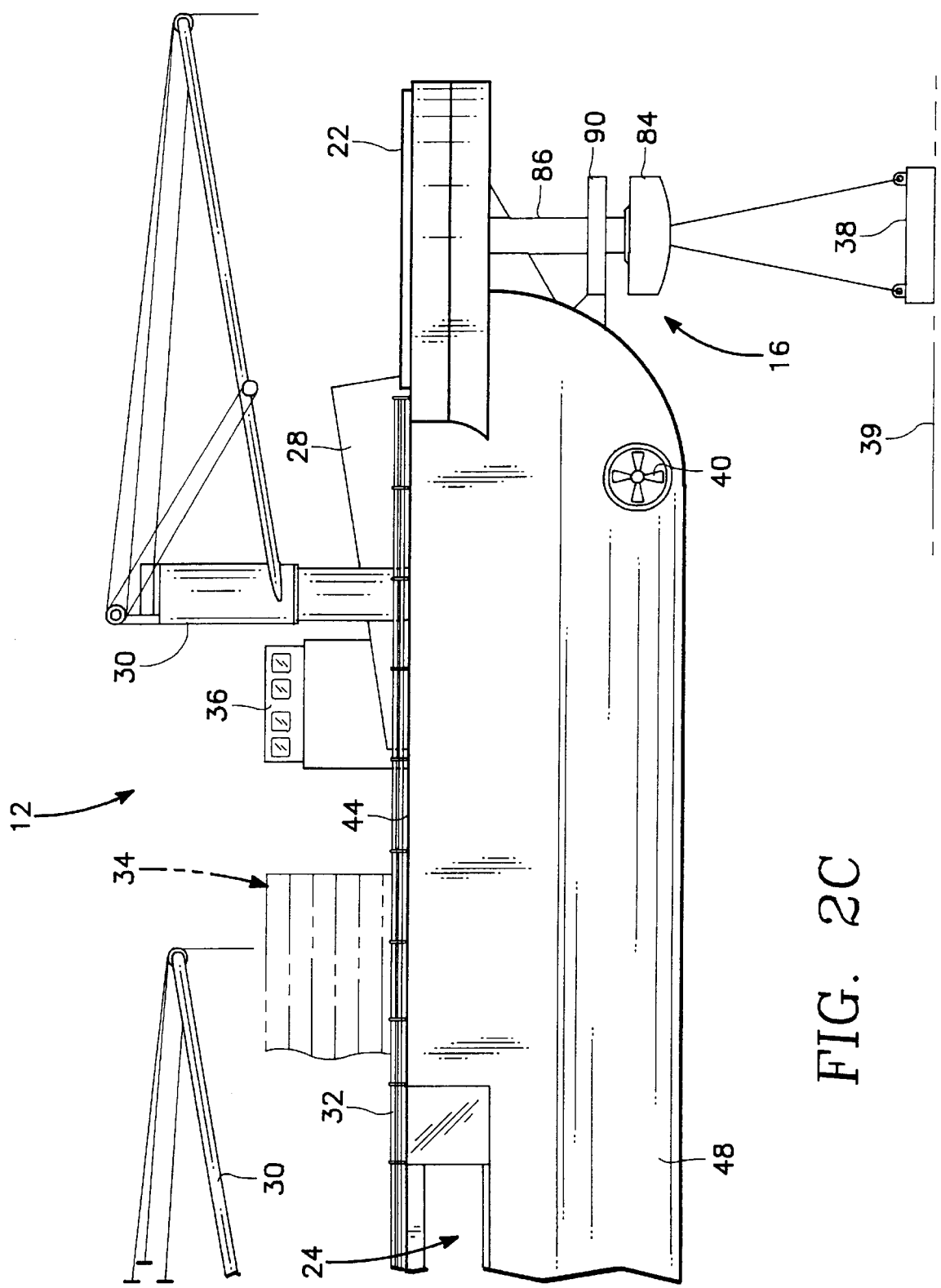

Referring to FIGS. 2A, 2B and 2C, floating pierhead structure 12 has a safety railing 32 which extends around the perimeter of the weather deck 44 of structure 12. There is also positioned at the stern 18 of structure 12 a plurality of skegs 46 which improve tow performance of structure 12 prior to being connected to causeway 14. Skegs 46 maintain floating pier structure 12 in a straight line while structure 12 is under tow.

Floating pier structure 12 may be used to store the components 34 of causeway 14 prior to the components 34 being assembled to form causeway 14. Components 34 comprise sufficient approachway components and construction equipment to assemble a causeway up to 10,000 feet.

Figure 4:
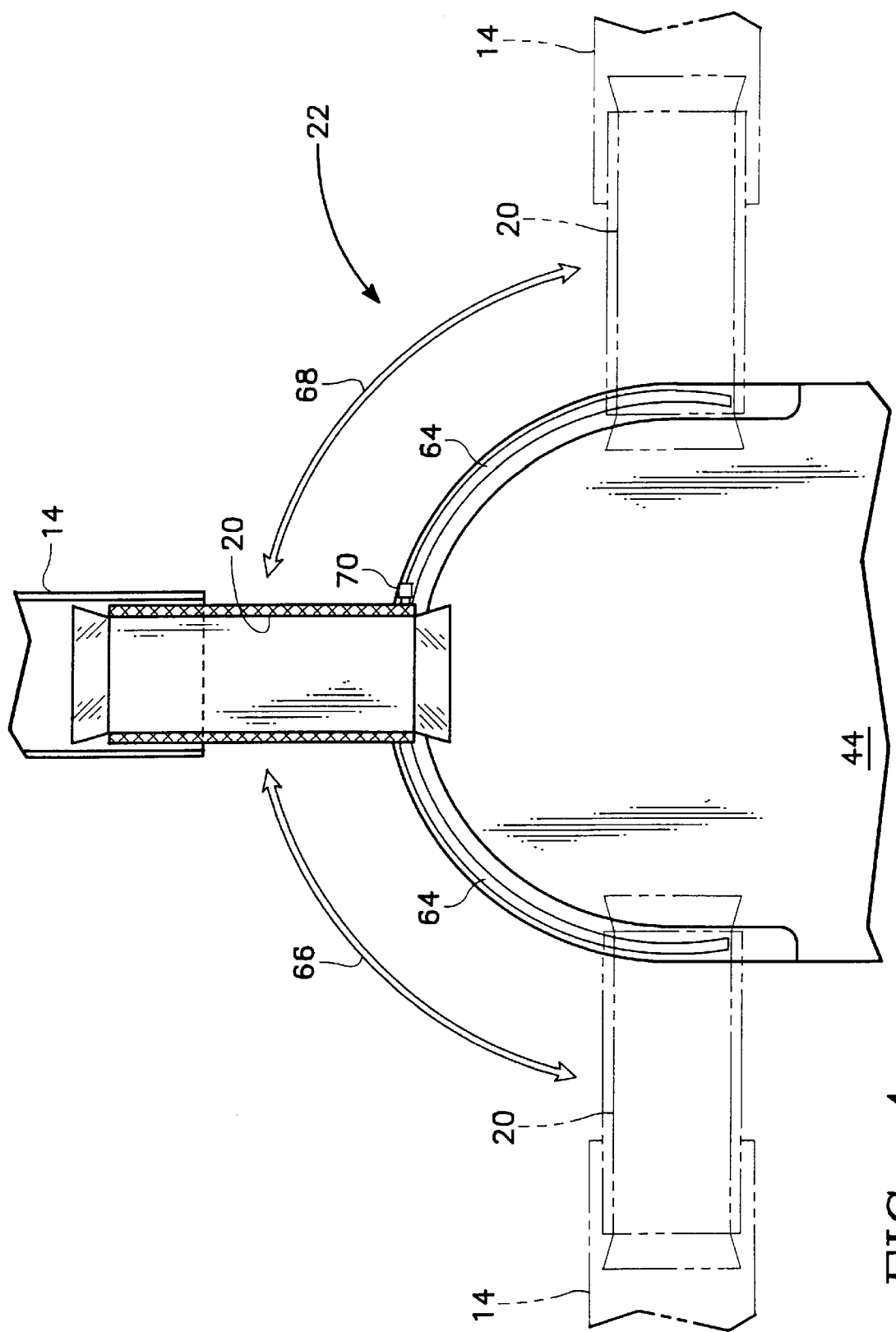
FIG. 4 is a top view of the bow of the floating pierhead structure of FIG. 1 connected to a causeway by a bridge span.
Figure 9:
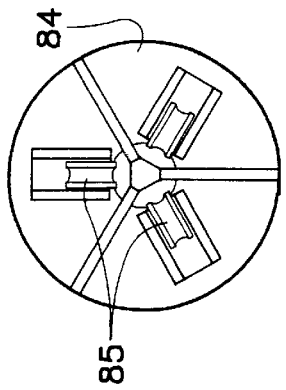
FIG. 9 is a top view of the sheave table of the single point mooring system of FIG. 5.
Figure 10:
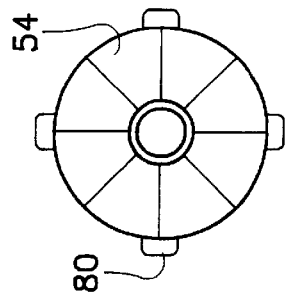
FIG. 10 is a top view of the counterweight of the single point mooring system of FIG. 5.
Figure 11:
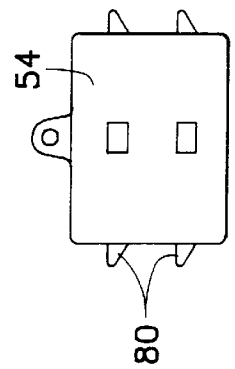
FIG. 11 is a side view of the counterweight of the single point mooring system of FIG. 5.

Weather deck 44 is the uppermost strength deck of floating pierhead structure 12 and is located seventy one feet above the baseline of hull 48. Bow 22 is cantilevered fifty feet over the end of hull 48 with its shape being semicircular. This allows bridge span 20 to be rotated over an angle 68 of ninety degrees in a counter clockwise direction and an angle 66 of ninety degrees in a clockwise direction with respect to the vertical position of bridge span as shown in FIG. 4.

Floating pierhead structure 12 also includes main deck 50 which functions as the bulkhead deck and is located fifty feet above the baseline of hull 48. There is also located below main deck 50 within hull 48 three lower decks 52 which are subdivided into five cargo holds and two machinery spaces. During throughput operations, main deck 50 provides through fare for vehicles entering pierhead floating structure 12 at stern ramp receiving platform 26 and side access ports 24. During transit main deck 50 is used for cargo storage including the approachway spans used to fabricate causeway 14.

Floating pierhead structure includes an operations control center 36 which is located port side and forward on the weather deck 44 of structure 12. Operations control center 36 has an enclosed height of 35 feet to provide line-of-site observation of cargo ship mooring, crane and vehicle offload operations on weather deck 44.

Figure 3A:
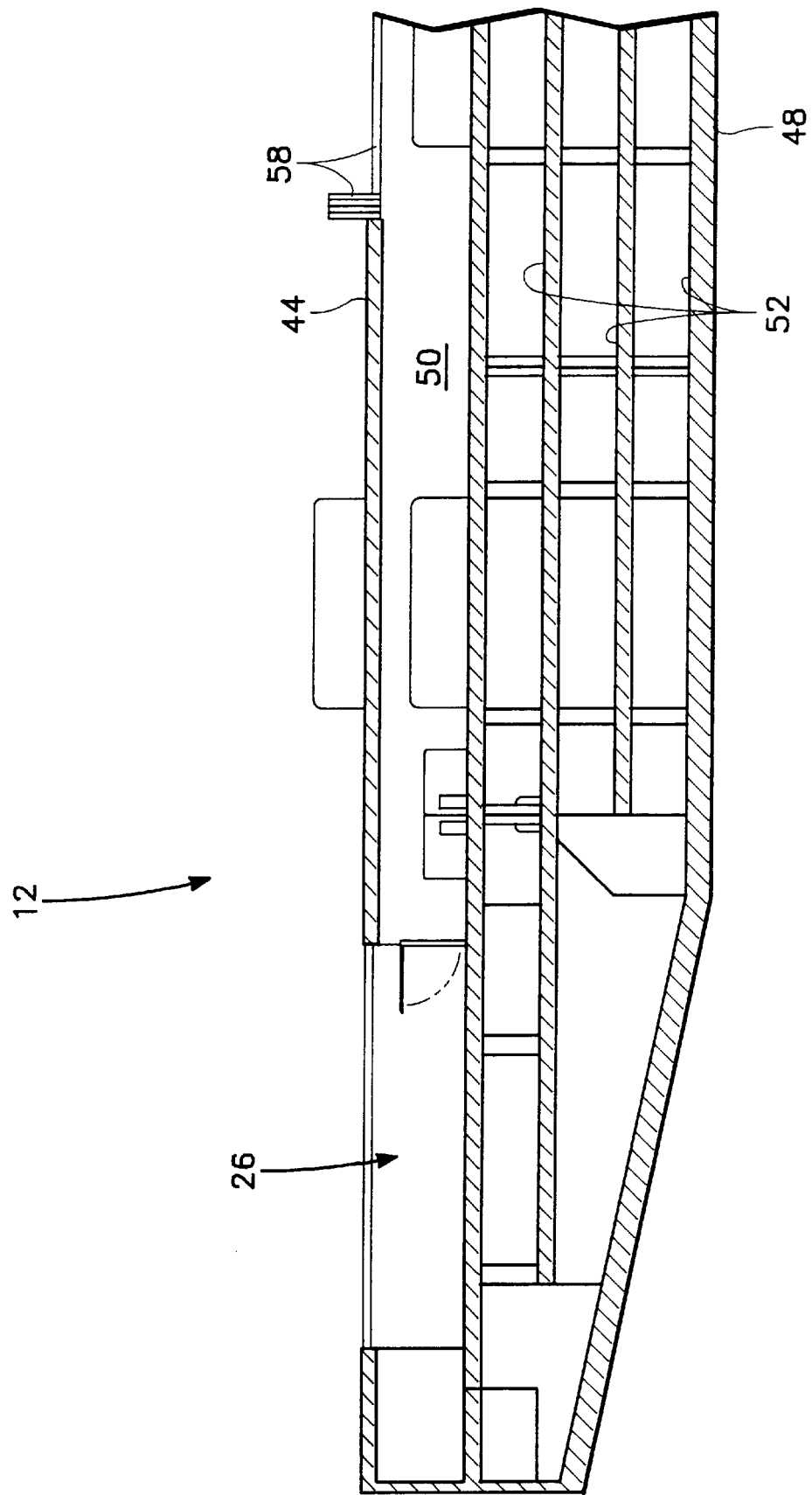
FIGS. 3A–3C is a cross sectional view of the side of the floating pierhead structure of the rapidly deployed pier system illustrated in FIGS. 2A–2C.
Figure 3B:
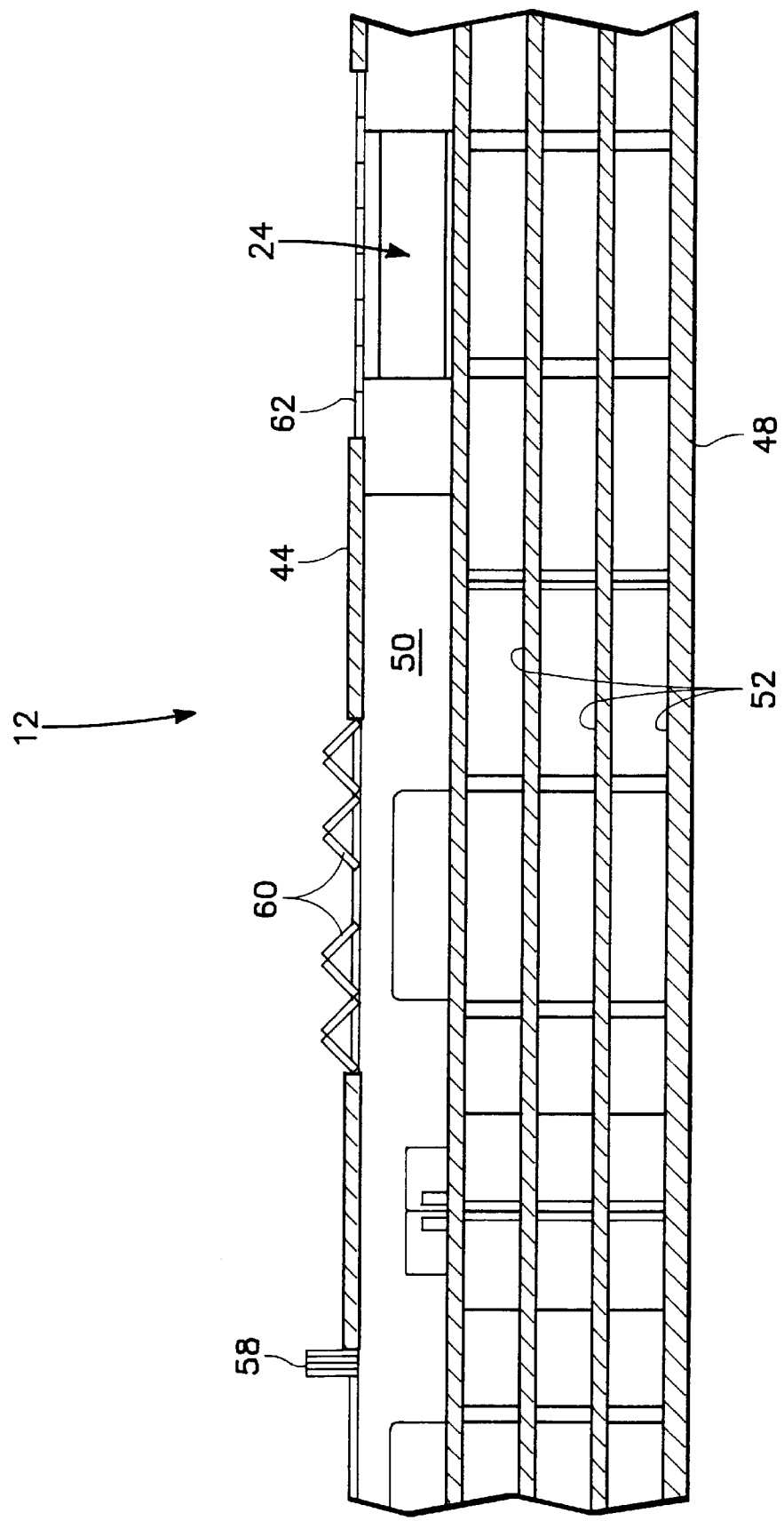
Figure 3C:
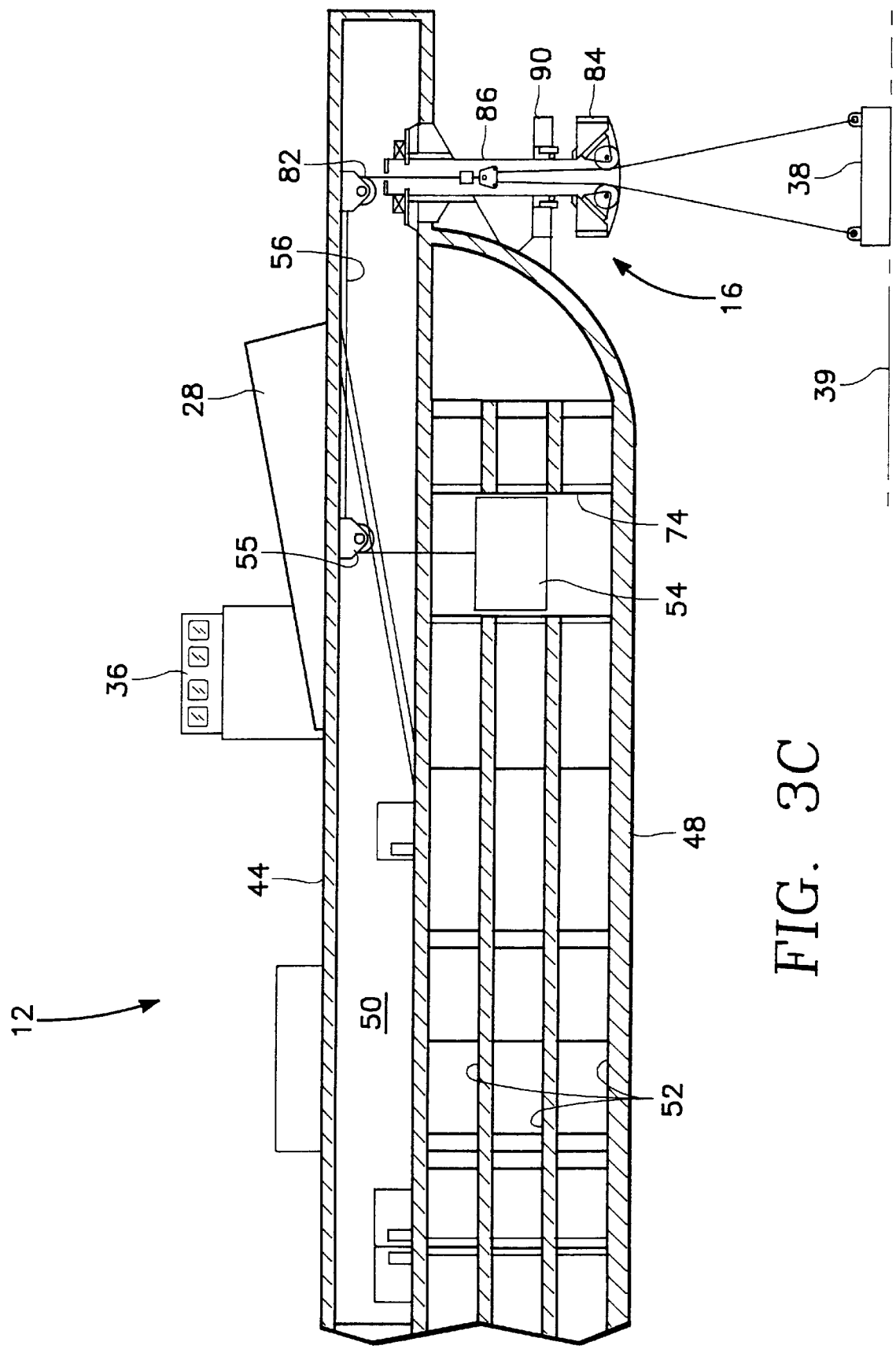

Weather deck 44 includes three hatches 58, 60 and 62 with hatch 58 being illustrated open, hatch 60 being illustrated partially open and hatch 62 being illustrated closed. Hatches 58, 60 and 62 each have a clear opening of 66 feet by 28 feet and hinged accordion style covers as shown in FIGS. 3A and 3B. There is also located on weather deck 44 a pair of hatches (not illustrated) which have clear openings of 42 feet by 12 feet.

The three lower decks 52 within hull 48 include a first deck which is located 34.5 feet above the baseline of hull 48, a second deck which is located 19.75 feet above the baseline of hull 48 and a tank deck located five feet above the baseline of hull 48. Each of the three lower decks 52 is used as cargo holds to store cargo during transit and operation. In addition, the bottom two decks 52 have machinery spaces for machinery used during cargo offload and other operations of floating pierhead structure 12.

Referring to FIGS. 1 and 4 the bow 22 has a semicircular shaped rail 64 upon which bridge span 20 rides as bridge span 20 is rotated through angles 66 and 68. When bridge span 20 is being utilized to connect causeway 14 to the starboard side of floating pierhead structure 12, bridge span 20 is rotated through angle 68 to the right side of weather deck 44 as shown in phantom in FIG. 4. In a like manner, when bridge span 20 is being utilized to connect causeway 14 to the port side of floating pierhead structure 12, bridge span 20 is rotated through angle 66 to the left side of weather deck 44 as shown in phantom in FIG. 4. Bridge span 20 also has a winch assembly 70 affixed thereto. The winch assembly 70 communicates with semicircular shaped rail 64 operating as a drive to facilitate movement of bridge span 20 around semicircular shaped rail 64 in the manner illustrated in FIG. 4.

Referring now to FIGS. 2C, 3C, 8, 9 and 14C there is located at the bow 22 of floating pierhead structure a single point mooring anchor system 16 and an adjustable seaward mooring system 19 positioned at the stern 18 of floating pierhead structure 12. The use of the single point mooring anchor system 16 and the adjustable seaward mooring system 19 provides a capability to reorient floating pierhead structure 12 with respect to causeway 14, even after installation, to an optimal position for resisting environmental loads such as seas and currents.

Single point mooring anchor system 16 includes a hexagonal shaped anchor base 38 which is connected by a mooring chain 56 to a counterweight 54 slidably mounted within a counterweight housing 74 located in a forward portion of the hull 48 of floating pierhead structure 12. Anchor base 38 of single point mooring system 16 is positioned approximately 74 feet from the end of causeway 14 to provide adequate clearance between floating pierhead structure 12 and causeway 14 and also to provide adequate length for bridge span 20 to accommodate the ramp angle for bridge span 20.

A turret column 86, which is external to hull 48 of structure 12, is positioned below the bow 22 and remains within a maximum twenty foot radius watch circle over anchor base 38 when floating pierhead structure 38 is moored. The upper end of turret column 86 is mounted in main deck 50. Roller bearings 87 are provided to allow floating pierhead structure 12 to rotate about turret column 86 so as to transfer horizontal and vertical loads to hull 48 of floating pierhead structure 12. A bottom collar 90 which is attached to hull 48 provides additional support for turret column 86. Bottom collar 90 also contains spherical bearings 89 which allow bottom collar 90 to rotate about turret column 86.

Chain 56 has one thereof connected to a padeye 73 located on top of counterweight 54. The opposite end of chain 56 is connected to a hook plate 57. Connected to hook plate 57 is one end of a plurality of anchor chain legs 59, which each have their opposite end connected to a padeye 37 of anchor base 38. In the preferred embodiment single point mooring system 16 has three anchor chain legs 59 which are spaced 120 degrees apart. Each of the three chain legs 59 engages a sheave 85 mounted on a sheave table 84 located at the base of turret column 86. The three sheaves 85 (illustrated in FIG. 9) maintain the three mooring chains of legs 59 at their respective 120 degree angles to assist in load distribution.

Figure 8:
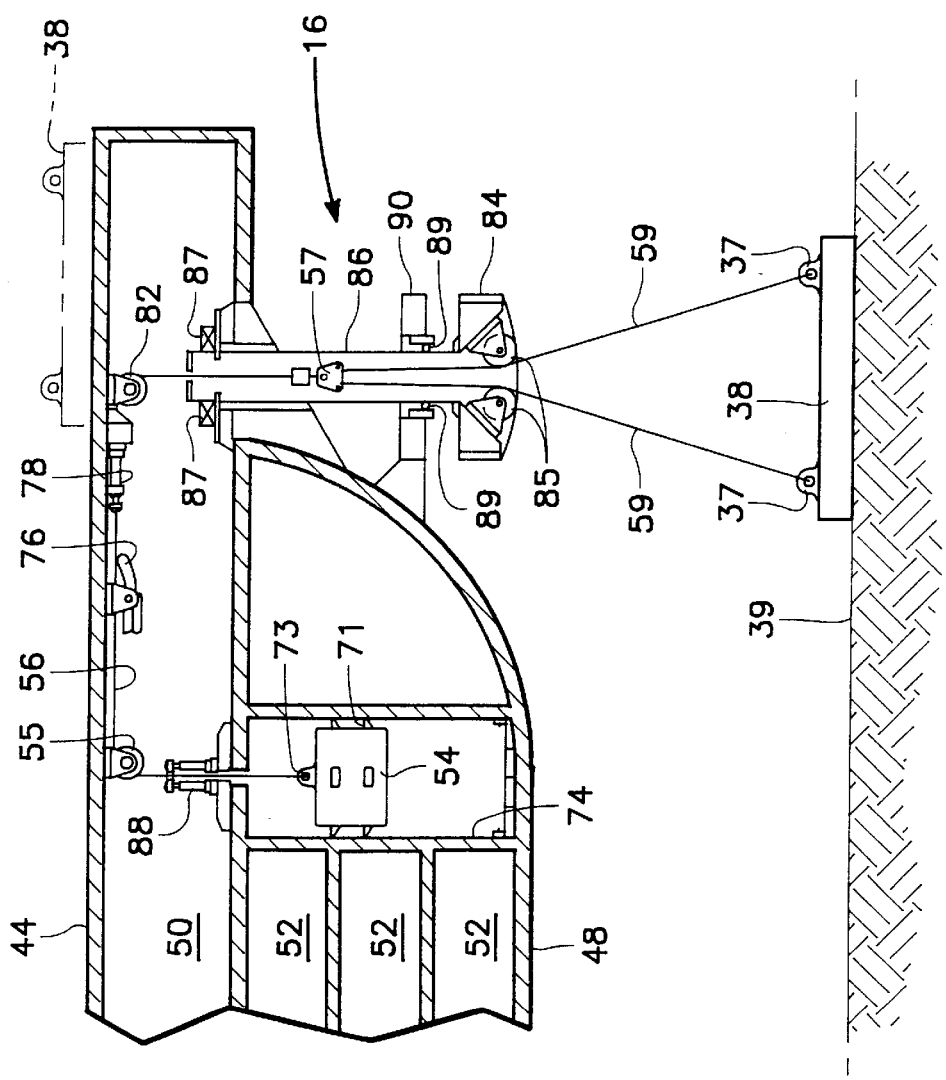
FIG. 8 is a detailed side view of the single point mooring system of FIG. 5.

When not in use anchor 38 may stored on the weather deck 44 of floating pierhead structure 12 as is best illustrated in phantom in FIG. 8.

As is best illustrated in FIG. 8, chain 56 has one end thereof connected to counterweight 54 and then runs through chain jack 88 affixed to the upper surface of main deck 50. Chain jack 88 is hydraulically operated providing a lift speed of approximately four feet per minute. Chain jack 88, which is positioned above counterweight 54, is used to lift and lower counterweight 54 during installation and retrieval operations. Chain 56 runs through a second chain jack 78 which is affixed to the bottom surface of weather deck 44. Chain jack 78 is used to pull floating pierhead structure 44 over its mooring center during installation and retrieval operation Located adjacent hydraulic pawl-type chain jack 78 is a chain stopper 76 which is also attached to the bottom surface of weather deck 44. Chain stopper 76 is remotely operated and adjust the chain length when required for accommodating variances in water depth which are allowable up to a maximum of 55 feet water depth.

Chain 56 also runs through a chain sheave 55 located directly above chain jack 88 and a chain sheave 82 located directly above turret column 86. Each of the chain sheaves 55 and 82 are mounted to the bottom surface of weather deck 44. Chain sheave 55 provides a ninety degree turn in chain 56 to align it with the centerline of counterweight 54, while chain sheave 82 provides a second ninety degree turn in chain 56 to align it with the centerline of turret column 86.

Referring to FIGS. 5, 6, 7, 8, 9 and 10, counterweight 54 comprises a cylindrical shaped 18 foot diameter bucket. Counterweight 54 is 12 foot deep bucket filled with iron ore that has a vertical range of motion of 34 feet within counterweight housing 74. Counterweight 54 weighs approximately 53,000 pounds when empty and 750,000 pounds when filled with iron ore. Counterweight housing 74 is also cylindrical shaped having a diameter of 21.5 feet and contains an alignment assembly 71 which consist of four equally spaced vertical rails 80 with self-adjusting bogey wheel assemblies 72 that guide the counterweight 54 up and down within the counterweight housing 74, maintaining contact with counterweight 54 at all times. The bottom of counterweight housing 74 is watertight and is capable of holding the static load of counterweight 54.

Referring now to FIGS. 1, 14, 15 and 16, floating pierhead structure 12 has adjustable seaward mooring system 19 positioned at its stern 18. The adjustable seaward mooring system 19 consist of four anchor legs 107, 108, 110 and 112. The anchor leg 110 on the port side and the anchor leg 112 on the starboard side of floating pierhead structure 12 comprises a continuous anchor line 109 that passes through the rigging 122 located at stern 18 of floating pierhead structure 12. In a like manner, the anchor leg 107 on the port side and the anchor leg 108 on the starboard side of structure 12 comprises a second continuous anchor line 119.

Each leg 110 and 112 of continuous anchor line 119 is controlled by a chain jack 115 or 117 and guided by a pair of sheaves 114 and 116 or 118 and 120. When one leg 110 of continuous anchor line 109 is under tension the opposite leg 112 of continuous anchor line 109 is slack. The two continuous anchor lines 109 and 119 are identical and are installed in parallel at the stern of floating pierhead structure 12. Legs 110 is secured to the ocean floor 39 with anchor system 111, while leg 112 is secured to ocean floor 39 with anchor system 113. In a like manner, leg 107 is secured to the ocean floor 39 with an anchor system (not illustrated) which is identical to anchor system 111, while leg 108 is also secured to the ocean floor 39 with an anchor system (not illustrated) which is identical to anchor system 111.

The anchor legs 107, 108, 110 and 112 are deployed nearly perpendicular to the stern 18 of floating pierhead structure 12. This mooring configuration allows the stern 18 of floating pierhead structure 12 to be adjusted across an arc 126 of ±45 degrees away from the initial installation orientation and also allows a constant length of anchor chain to be used for each continuous anchor line 109 and 119.

From the foregoing, it may readily be seen that the present invention comprises a new, unique and exceedingly useful rapidly deployed pier for use in providing a temporary deep water port facility which constitutes a considerable improvement over the known prior art. Obviously many modifications and variations of the present invention are possible in light of the above teachings. It is therefore to be understood that within the scope of the appended claims that the invention may be practiced otherwise than as specifically described.

What is claimed is:

1. A floating pier comprising:

a floating pierhead structure adapted to be floated on a body of water adjacent a shoreline, said floating pierhead structure having a generally semicircular shaped bow, said generally semicircular shaped bow having a semicircular shaped rail mounted on the top portion of said semicircular shaped bow;

an elevated approachway having one end thereof connected to said shoreline and an opposite end thereof connected to said floating pierhead structure;

said elevated approachway including a plurality of identical two lane wide roadway spans, a traffic bypass span and a gap closing span;

said traffic bypass span being positioned approximately at a midpoint of said elevated approachway;

said gap closing span being adapted to connect a portion of said elevated approachway extending from said shoreline to another portion of said elevated approachway extending from said floating pierhead structure when installation of said elevated approachway is complete;

a bridge span having one end fixedly connected to said elevated approachway and an opposite end riding on the semicircular shaped rail of said semicircular shaped bow;

said bridge span having a winch assembly communicating with the semicircular shaped rail of said semicircular shaped bow, said winch assembly operating as a drive source to facilitate rotational movement of said floating pierhead structure through a predetermined angle about said elevated approachway.

2. The floating pier of claim 1 wherein each of said plurality of identical two lane wide roadway spans has a length of about sixty feet and a width of about twenty four.

3. The floating pier of claim 1 wherein said traffic bypass span has a length of approximately one hundred eighty feet and a width of approximately twenty four feet.

4. The floating pier of claim 1 wherein said predetermined angle said floating pierhead structure rotates about said elevated approachway is ±45 degrees from an initial installation position which directly aligns said elevated approachway with said floating pierhead structure.

5. A floating pier comprising:

a floating pierhead structure adapted to be floated on a body of water adjacent a shoreline, said floating pierhead structure comprising:

a hull floating on said body of water;

a weather deck mounted on a top portion of said hull, said weather deck having a generally semicircular shaped bow, said generally semicircular shaped bow including a semicircular shaped rail mounted on the top portion of said semicircular shaped bow;

a main deck positioned within said hull below said weather deck;

said main deck having a stern ramp receiving platform located at a seaward end of said floating pierhead structure, said stern ramp receiving platform being adapted to receive stern ramps from ocean going vessels equipped with said stern ramps;

a ramp communicating with said main deck and said weather deck to allow for a flow of vehicular traffic between said weather deck and said main deck;

an elevated approachway having one end thereof connected to said shoreline and an opposite end thereof connected to said floating pierhead structure;

said elevated approachway including a plurality of identical two lane wide roadway spans, a traffic bypass span and gap closing span;

said traffic bypass span being positioned approximately at a midpoint of said elevated approachway;

said gap closing span being adapted to connect a portion of said elevated approachway extending from said shoreline to another portion of said elevated approachway extending from said floating pierhead structure when installation of said elevated approachway is complete;

a bridge span having one end fixedly connected to said elevated approachway and an opposite end riding on the semicircular shaped rail of said semicircular shaped bow;

said bridge span having a winch assembly communicating with the semicircular shaped rail of said semicircular shaped bow, said winch assembly operating as a drive source to facilitate rotational movement of said floating pierhead structure through a predetermined angle about said elevated approachway.

6. The floating pier of claim 5 wherein each side of the hull of said floating pierhead structure includes a pair of thrusters with a first of said pair of thrusters being positioned within said hull at a fore end of said floating pierhead structure and a second of said pair of thrusters being positioned within said hull at an aft end of said floating pierhead structure.

7. The floating pier of claim 5 further comprising a plurality of skegs affixed to a bottom portion of said hull of said floating pierhead structure, said plurality of skegs being positioned at the seaward end of said hull.

8. The floating pier of claim 5 further comprising first, second, third and fourth pedestal cranes located on a starboard side of said floating pierhead structure, said first, second, third and fourth pedestal cranes being mounted on the weather deck of said floating pierhead structure.

9. The floating pier of claim 5 further comprising a single point mooring anchor system located at the semicircular shaped bow of said floating pierhead structure and an adjustable seaward mooring system positioned at the seaward end of said floating pierhead structure, said single point mooring anchor system and said adjustable seaward mooring system allowing for orientation of said floating pierhead structure through said predetermined angle about said elevated approachway.

10. The floating pier of claim 9 wherein said single point mooring anchor system comprises:
   a counterweight slidably mounted within a counterweight housing located in a forward portion of the hull of said floating pierhead structure, said counterweight having a padeye affixed to the top of said counterweight;
   a turret column positioned at the semicircular shaped bow of said floating pierhead structure, said turret column being rotationally mounted within said main deck to allow for rotational movement of said floating pierhead structure through said predetermined angle;
   a bottom collar attached to said hull, said bottom collar being rotatably coupled to said turret column to allow said bottom collar to rotate about said turret column;
   a first chain jack affixed to the upper surface of said main deck directly above said counterweight;
   a first chain sheave positioned directly above said chain jack, said first chain sheave being attached to the bottom surface of said weather deck;
   a second chain sheave positioned directly above said turret column, said second chain sheave being attached to the bottom surface of said weather deck;
   a second chain jack positioned between said first chain sheave and said second chain sheave, said second chain jack being attached to the bottom surface of said weather deck;
   a hook plate positioned within said turret column;
   a mooring chain having one end thereof connected to the padeye of said counterweight and an opposite end thereof connected to said hook plate, said mooring chain extending from the padeye of said counterweight through said first chain jack, said first chain sheave, said second chain jack and said second chain sheave to said hook plate;
   an anchor base positioned below said turret column;
   first, second and third anchor chain legs for connecting said hook plate to said anchor base, said first, second and third anchor chain legs being spaced one from and another by an angle of approximately one hundred twenty degrees;
   a sheave table mounted on the bottom of said turret column, said sheave table having first, second and third anchor chain sheaves, said first, second and third anchor chain sheaves being spaced one from another by said angle of approximately one hundred twenty degrees, each of said first, second and third anchor chain legs engaging only one of said first, second and third anchor chain sheaves of said sheave table.

11. The floating pier of claim 10 wherein said single point mooring anchor system further comprises a chain stopper attached to the bottom surface of said weather deck and engaging said mooring chain.

12. The floating pier of claim 9 wherein said adjustable seaward mooring system comprises:
   first and second sheaves attached to the bottom surface of said weather deck;
   first and second chain jacks attached to the top surface of said main deck, said first chain jack being positioned below said first sheave and said second chain jack being positioned below said second sheave;
   third and fourth sheaves attached to the hull of said floating pierhead structure, said third sheave being positioned below said first chain jack and said fourth sheave being positioned below said second chain jack;
   first and second anchors adapted to be fixed in position on the floor of said body of water; and
   a continuous anchor line for connecting said first and second anchors, said continuous anchor line extending from said first anchor through said first, second, third and fourth sheaves and said first and second chain jacks to said second anchor.

13. A floating pier comprising:
   a floating pierhead structure adapted to be floated on a body of water adjacent a shoreline, said floating pierhead structure comprising:
   a hull floating on said body of water;
   a weather deck mounted on a top portion of said hull, said weather deck having a generally semicircular shaped bow, said generally semicircular shaped bow including a semicircular shaped rail mounted on the top portion of said semicircular shaped bow;
   a main deck positioned within said hull below said weather deck;
   said main deck having a stern ramp receiving platform located at a seaward end of said floating pierhead structure, said stern ramp receiving platform being adapted to receive stern ramps from ocean going vessels equipped with said stern ramps;
   a ramp communicating with said main deck and said weather deck to allow for a flow of vehicular traffic between said weather deck and said main deck;
   an elevated approachway having one end thereof connected to said shoreline and an opposite end thereof connected to said floating pierhead structure;
   said elevated approachway including a plurality of identical two lane wide roadway spans, a traffic bypass span and a gap closing span;
   said traffic bypass span being positioned approximately at a midpoint of said elevated approachway;
   said gap closing span being adapted to connect a portion of said elevated approachway extending from said shoreline to another portion of said elevated approachway extending from said floating pierhead structure when installation of said elevated approachway is complete;
   a bridge span having one end fixedly connected to said elevated approachway and an opposite end riding on the semicircular shaped rail of said semicircular shaped bow;

said bridge span having a winch assembly communicating with the semicircular shaped rail of said semicircular shaped bow, said winch assembly operating as a drive source to facilitate rotational movement of said floating pierhead structure through a predetermined angle about said elevated approachway;

a single point mooring anchor system located at the semicircular shaped bow of said floating pierhead structure;

an adjustable seaward mooring system positioned at the seaward end of said floating pierhead structure, said single point mooring anchor system and said adjustable seaward mooring system allowing for orientation of said floating pierhead structure through said predetermined angle about said elevated approachway; and a plurality of pedestal cranes located on a starboard side of said floating pierhead structure, said plurality of pedestal cranes being mounted on the weather deck of said floating pierhead structure.

14. The floating pier of claim 13 wherein each side of the hull of said floating pierhead structure includes a pair of thrusters with a first of said pair of thrusters being positioned within said hull at a fore end of said floating pierhead structure and a second of said pair of thrusters being positioned within said hull at an aft end of said floating pierhead structure.

15. The floating pier of claim 13 further comprising a plurality of skegs affixed to a bottom portion of said hull of said floating pierhead structure, said plurality of skegs being positioned at the seaward end of said hull.

16. The floating pier of claim 13 wherein said single point mooring anchor system comprises:

a counterweight slidably mounted within a counterweight housing located in a forward portion of the hull of said floating pierhead structure, said counterweight having a padeye affixed to the top of said counterweight;

a turret column positioned at the semicircular shaped bow of said floating pierhead structure, said turret column being rotationally mounted within said main deck to allow for rotational movement of said floating pierhead structure through said predetermined angle;

a bottom collar attached to said hull, said bottom collar being rotatably coupled to said turret column to allow said bottom collar to rotate about said turret column;

a first chain jack affixed to the upper surface of said main deck directly above said counterweight;

a first chain sheave positioned directly above said chain jack, said first chain sheave being attached to the bottom surface of said weather deck;

a second chain sheave positioned directly above said turret column, said second chain sheave being attached to the bottom surface of said weather deck;

a second chain jack positioned between said first chain sheave and said second chain sheave, said second chain jack being attached to the bottom surface of said weather deck;

a hook plate positioned within said turret column;

a mooring chain having one end thereof connected to the padeye of said counterweight and an opposite end thereof connected to said hook plate, said mooring chain extending from the padeye of said counterweight through said first chain jack, said first chain sheave, said second chain jack and said second chain sheave to said hook plate;

an anchor base positioned below said turret column;

first, second and third anchor chain legs for connecting said hook plate to said anchor base, said first, second and third anchor chain legs being spaced one from and another by an angle of approximately one hundred twenty degrees;

a sheave table mounted on the bottom of said turret column, said sheave table having first, second and third anchor chain sheaves, said first, second and third anchor chain sheaves being spaced one from another by said angle of approximately one hundred twenty degrees, each of said first, second and third anchor chain sheaves engaging only one of said first, second and third anchor chain legs of said sheave table.

17. The floating pier of claim 16 wherein said single point mooring anchor system further comprises a chain stopper attached to the bottom surface of said weather deck and engaging said mooring chain.

18. The floating pier of claim 13 wherein said adjustable seaward mooring system comprises:

first and second sheaves attached to the bottom surface of said weather deck;

first and second chain jacks attached to the top surface of said main deck, said first chain jack being positioned below said first sheave and said second chain jack being positioned below said second sheave;

third and fourth sheaves attached to the hull of said floating pierhead structure, said third sheave being positioned below said first chain jack and said fourth sheave being positioned below said second chain jack;

first and second anchors adapted to be fixed in position on the floor of said body of water; and a continuous anchor line for connecting said first and second anchors, said continuous anchor line extending from said first anchor through said first, second, third and fourth sheaves and said first and second chain jacks to said second anchor.

\* \* \* \* \*